United States Patent [19]

Lewis

[11] 4,119,962
[45] Oct. 10, 1978

[54] MULTIPLE MEMORY ADAPTIVE MTI

[75] Inventor: Bernard L. Lewis, Oxon Hill, Md.

[73] Assignee: The United States of America as represented by the Secretary of the Navy, Washington, D.C.

[21] Appl. No.: 854,446

[22] Filed: Nov. 23, 1977

[51] Int. Cl.$^2$ ............................................. G01S 9/42
[52] U.S. Cl. ................................ 343/7.7; 343/100 LE
[58] Field of Search ........................... 343/7.7, 100 LE

[56] References Cited
U.S. PATENT DOCUMENTS

3,786,509  1/1974  Applebaum et al. ............. 343/7.7 X
3,978,483  8/1976  Lewis et al. ..................... 343/100 LE Primary Examiner—Maynard R. Wilbur
Assistant Examiner—Richard E. Berger
Attorney, Agent, or Firm—R. S. Sciascia; Philip Schneider; David G. Rasmussen

[57] ABSTRACT

A moving-target indicator system uses adaptive loop cancellers for cancelling clutter. Each adaptive-loop canceller uses multiple memories and a switching circuit. The switching circuit switches each memory into the circuit to allow each of the memories to develop a weight W for a different selected range interval on a pulse-to-pulse basis.

5 Claims, 6 Drawing Figures

MULTIPLE MEMORY ADAPTIVE MTI

BACKGROUND OF THE INVENTION

1. Field of the Invention

The invention relates to a moving-target indicator system (MTI) utilizing adaptive-loop concellers for cancelling clutter. More particularly, the adaptive-loop cancellers utilize multiple memories to store the developed weight W for selected range intervals on a pulse-to-pulse basis.

2. Description of the Prior Art

In MTI systems the received radar-return pulses include desired target reflections and undesired clutter from the sea surface, slow-moving rain squalls, chaff, etc. The radar clutter is correlated from pulse-to-pulse while the target reflections are moving quickly and have a phase change from pulse-to-pulse, thus being uncorrelated. An MTI system cancels all correlated signals on a pulse-to-pulse basis, thus cancelling clutter, and passes uncorrelated signals, thus passing target reflections.

The use of adaptive loop cancellers to cancel correlated signals in moving target indicator systems is known. One type of adaptive-closed-loop canceller (FIGS. 1, 2), disclosed in U.S. Pat. No. 3,978,483, uses a pair of adaptive loops which separately compute the I and Q components of the complex weight and use D.C. weights in each loop. A second type of adaptive loop canceller, which is the subject of copending U.S. Pat. application Ser. No. 818,180, now Pat. No. 4,086,592, (assigned to the Navy), not herein considered to be prior art, is a digital open loop canceller which computes the optimum weight digitally with an open loop.

A problem common to these loops is that the averaging time taken to build up the weight W for each of the different types of loop must be relatively fast. This is because each returned radar pulse covers a time span during which radar reflections from different sources of clutter in different range intervals may come in at different times. Since the reflections from each type of clutter are received in time sequence the weight W of the loop must be set to zero and a new weight developed for each type of clutter. Since the weight developed must start from zero it must build up very quickly and hence have a short time constant. Because the weight builds up quickly to allow clutter cancellation, it also builds up quickly for fast moving desired targets and may also cancel them.

SUMMARY OF THE INVENTION

The present invention provides apparatus for preventing the cancellation of desired targets. The apparatus will independently develop a weight for each source of clutter on a pulse-to-pulse basis and store the weight separately. The weight for each source of clutter is added (i.e., integrated) from pulse-to-pulse. Therefore, the amount of weight build up during each pulse need only be small. This means that the time constant for developing the weight in each canceller can be lengthened. Since the target is fast-moving, thus moving from range interval to range interval quickly, the target weight will not have a chance to be integrated in any range interval. Hence no weight will be built up and the adaptive loop canceller will not cancel the target.

In the MTI system, an antenna receives successive radar pulses which each include reflections from the clutter sources and the target. One or more serial PRI (pulse repetition interval) delays provide a delay to each successive pulse. The delayed pulses and the antenna signal act as concurrent signal sources for the MTI operation. Each of the signal sources is fed to an MTI canceller which has one or more adaptive loop cancellers. Each of the adaptive loop cancellers, which may be either a closed-loop canceller or a digital, open-loop canceller, has multiple memories which will develop and store weights for several individual clutter sources on a pulse-to-pulse basis. A switching circuit will switch the memory for a particular source of clutter into the adaptive loop at the appropriate time during each pulse so that the weight can be integrated for the clutter source on a pulse-to-pulse basis.

BRIEF DESCRIPTION OF THE PREFERRED EMBODIMENT

Figure 1:
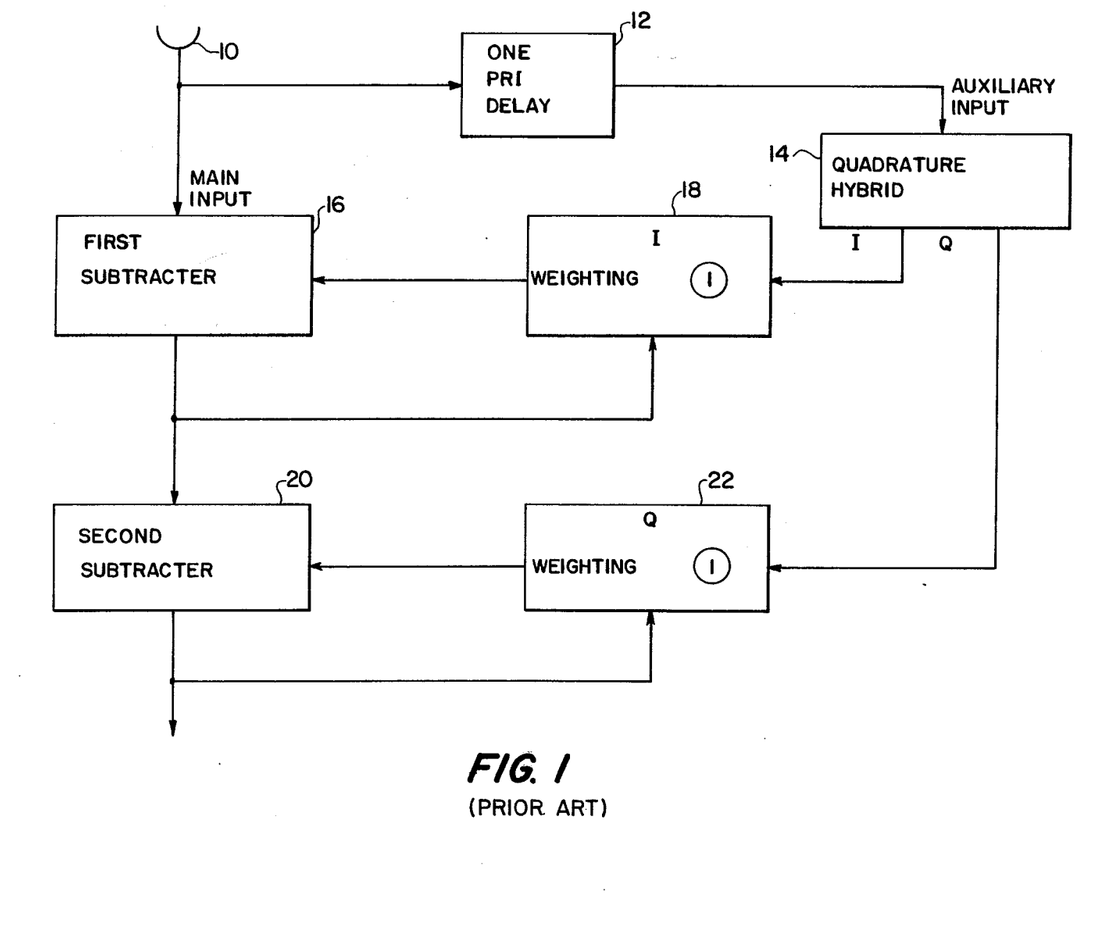
FIG. 1 is a block diagram of a conventional MTI system using an adaptive-closed-loop canceller in which the I and Q components of weight W are developed separately.

A prior-art MTI system is shown in FIG. 1. The system includes an antenna 10, a one-pulse-repetition-interval delay 12 (hereinafter designated a "one PRI delay") and an MTI canceller made up of quadrature-hybrid circuit 14 and a pair of adaptive-closed-canceller loops.

The first adaptive canceller loop has a first subtractor 16 and an I weighting circuit 18. The second adaptive canceller loop has a second subtractor 20 and a Q weighting circuit 22. The MTI canceller is fully described in U.S. Pat. No. 3,978,483 hereby incorporated by reference. The antenna and one PRI delay provide two successive radar-return pulses to the canceller concurrently. The delayed pulse is the auxiliary input to the canceller and the pulse directly from the antenna is the main input.

The I component from quadrature-hybrid circuit 14 is coupled as an input to I weighting circuit 18 which also receives an input from the output of the first substractor 16 and provides an output which is coupled back as a second input to the first subtracter 18 for subtraction from the main-channel input signal. This forms the first adaptive loop. The adaptive loop acts to develop an I weight for operation on the I components which may then be subtracted from the main channel signal to form a main channel residue output. In a like manner, the Q component is connected as an input to a Q weighting circuit 22 which receives an input from the output of the second subtracter 20 and provides an output which is coupled back as a second input to the second subtracter, for subtraction from the main channel residue signal from the output of the first subtractor. This forms the second adaptive loop. The second adaptive loop acts to develop a Q weight for operation on the Q component in the same manner as the I loop such that interference in the main channel signal may be reduced. Although only a two-pulse MTI system is shown, N pulse MTI systems using multiple cancellers are known in the art and are considered included by the principles involved here.

Figure 2:
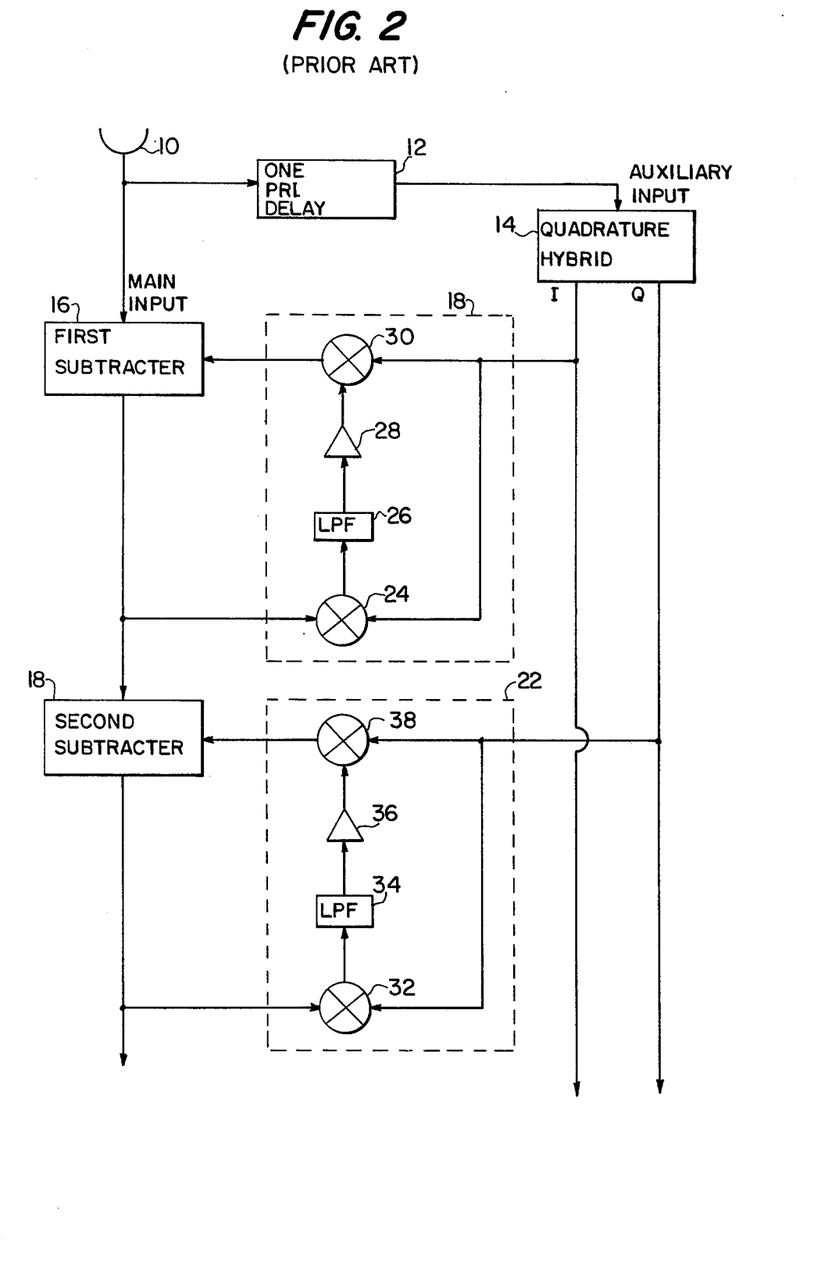
FIG. 2 is a block diagram showing the details of each adaptive loop of the adaptive-closed-loop canceller of FIG. 1.

FIG. 2 shows the details of conventional weighting circuits 18, 22 of the FIG. 1. The I weighting circuit 18 has a first multiplier 24 a low pass filter 26, an amplifier 28 and a second multiplier 30. The Q weighting circuit is identical and a first multiplier 32, a low pass filter 34, an amplifier 36, and a second multiplier 38. The weighting circuits are fully described in the aforementioned U.S. Pat. No. 3,978,483.

Looking at weighting circuit 18 the output of subtracter 16 and the I component from quadrature hybrid 14 (which is at the same frequency as the main channel loop input) is coupled as input to a first multiplier 24. The output of the multiplier 24 is then coupled through a low-pass filter 26 which filters out upper sidebands and passes D.C. and low frequency signals that are called the weighting function. The weighting function is then amplified in a high-gain D. C. amplifier 28 and coupled as input along with the I component to a multiplier 30. The output of the multiplier 30 is then coupled back to a subtracter 16 where it is subtracted from the main channel signal. As can be seen, each subtracter output is a main-channel residue output that is used as the main-channel signal for the next succeeding subtractor. The operation of the loop to develop the weighting function is similar to conventional adaptive loops except that the weighting function is D.C. due to the same frequency inputs at multiplier 24. The loops operate to cause the weighting functions to go towards zero by negative feedback to achieve maximum cancellation. The operation of Q weighting circuit 22 is identical to that of I weighting circuit 18 except that the Q component from quadrature hybrid 10 is used. As can be seen, contrary to some conventional sytems which offset the main channel signal at the loop input, the present invention is constructed such that the loop input frequency is the same as the loop output frequency.

Figure 3:
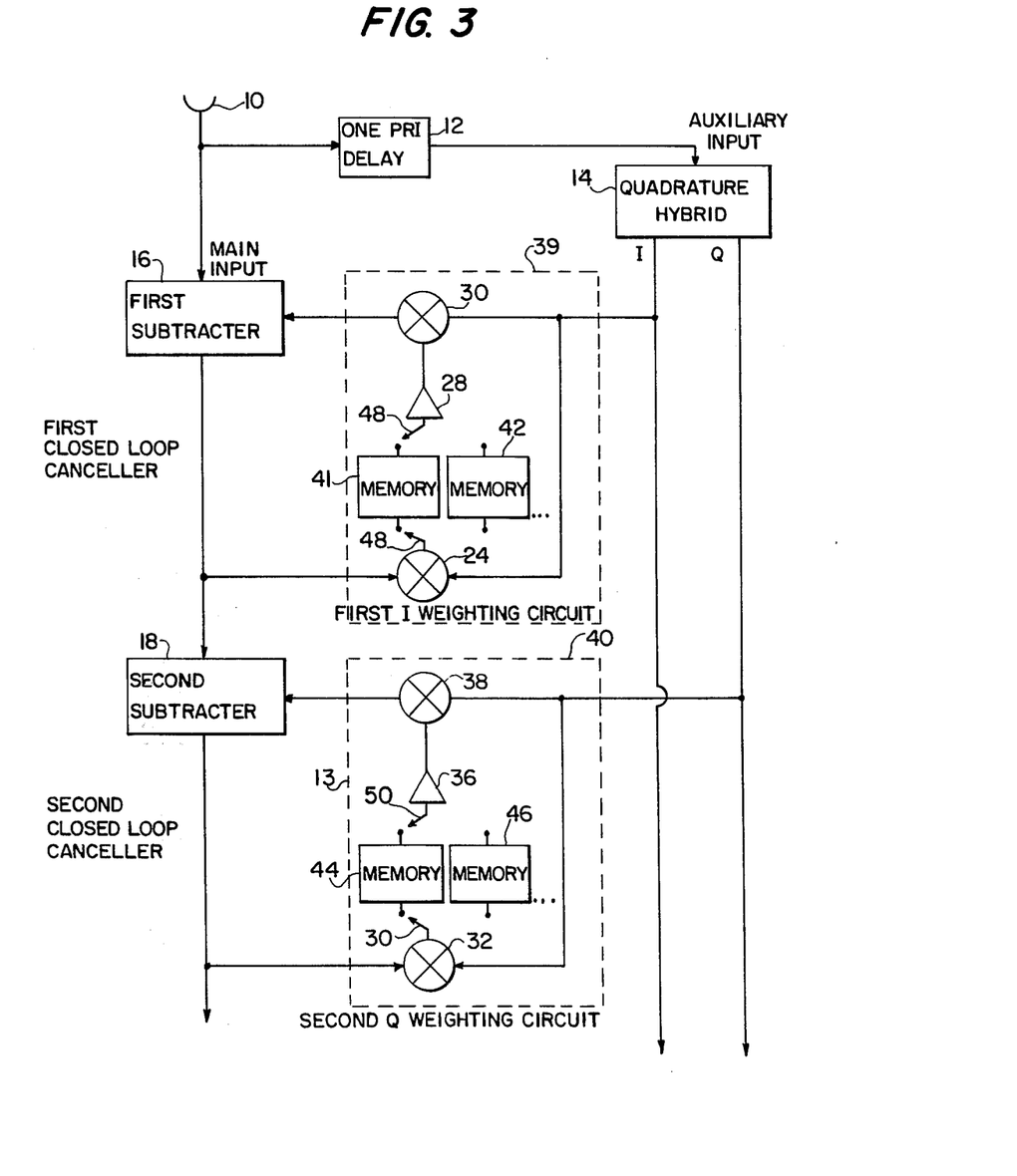
FIG. 3 is a block diagram of the MTI system of FIG. 2 having mutiple memory circuits according to the present invention.

FIG. 3 shows the conventional MTI system of FIG. 2 with I and Q weighting circuits 18, 22 replaced by first I weighting circuit 39 and second Q weighting circuit 40. Weighting circuits 18, 22 and 39, 40 use the same components (which are similarly numbered) with the exception that low pass filters 26, 34 of weighting circuits 18, 22 are replaced by memories 41, 42, 44, 46 and switching circuits 48, 50 of weighting circuits 39, 40. An operator observing on a display that clutter lies in a particular range interval may use switches 48, 50 to switch memories 41, 44 into first I and second Q circuits 39, 40 respectively to develop and store weights. Similarly, he may switch in a second set of memory circuits 42, 46 for a clutter source in a second range interval.

Figure 4:
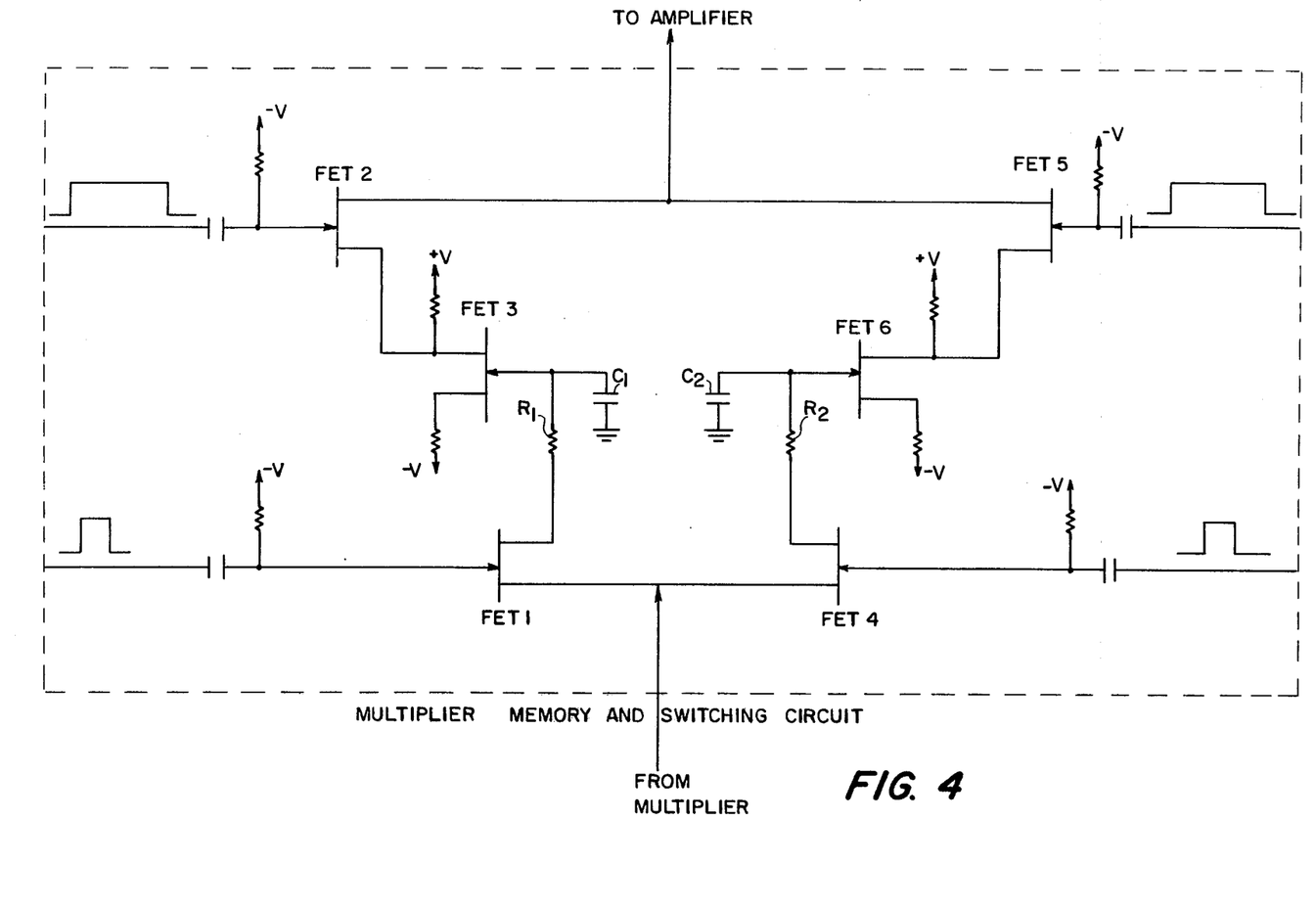
FIG. 4 is a schematic drawing of one type of multiple memory circuit used in the adaptive-closed-loop canceller of FIG. 3.

FIG. 4 shows an embodiment of switching assembly 48 and memory circuits 41, 42 of FIG. 3. Memory 41 is made up of RC circuit $R_1C_1$ while memory 42 is made up of RC circuit $R_2C_2$. Switching assembly 48 is made up of FETs 1, 2, 3, 4, 5, 6 with biasing and a conventional operator control (not shown) for generating two pairs of control pulses. One pair of control pulses are fed to FETs 1, 2, 3, to activate RC memory 41 for one clutter source while the second pair of pulses are fed to FETs 4, 5, 6 to activate RC memory $R_2C_2$ for a second clutter source. The electronic configuration of the switching assembly is not critical and many other conventional commutation type switching arrangements could be used. RC memories 44, 46 and switching assembly 50 of second Q weighting circuit 40 are identical to those of first I weighting circuit 39 and are not shown. Operation of the switching circuit will be described subsequently.

In the operation of the MTI system shown in FIG. 3, the radar is operated for a short time during which no cancellation takes place and the clutter begins showing up on the display. The radar operator is able to ascertain which range interval each clutter source is in. He has controls which will operate memory circuits 41, 42, 44, 46 so that memories 41, 42 will be in the MTI circuit for the range interval including the first clutter source and memories 44, 46 will be in the MTI circuit for the range interval including the second clutter source. More memories could be included for more clutter sources.

After selection of the memory circuits, the MTI system is ready to begin cancellation of clutter. The first radar pulse is reflected successively from each source of clutter, depending on range of the clutter, and from the desired target. Another radar pulse one PRI behind is similarly reflected from the various sources of clutter and target. Antenna 10 receives the radar returns with the first reflections for the first pulse being from clutter at close range. Other reflections from the first radar pulse follow and are in turn followed one PRI later by those from the second pulse.

All returned reflections for the first radar pulse are stored in time sequence in one PRI delay 12. One PRI later the reflections from the second pulse begin to be received in sequence and are applied to subtracter 16, whose output is directed to multiplier 24. Concurrently, the first reflection of the first pulse from one PRI delay 12 is fed to quadrature hybrid 14 which separates the complex signal into I and Q components and feeds the I components to multiplier 24. Multiplication takes place and the output is fed through Switch 48 to memory circuit 41. Memory circuit 41 (FIG. 4), made up of RC circuit $R_1C_1$, will filter the output of multiplier 24 and pass only D.C. and low frequency signals which are the weighting function. The weight will be passed to amplifier 30 and the remainder of the adaptive loop to allow for cancellation of the I component of the clutter in subtracter 16. Similarly, weighting circuit 40 will have memory 44 switched in which will develop a weight and allow cancellation of the Q component of the first clutter source in subtracter 18. As the range interval ends, switches 48, 50 switch memories 41, 44 out of the circuit and memories 42, 46 into the circuit. Memories 41, 44 are switched out of the circuit in such a way that RC circuit $R_1C_1$ is not discharged and the weight is retained in both memories. Memories 42, 46 in the same manner as memories 41, 44 now develop a weight for the clutter in the second range interval. Cancellation of the I, Q components of the second clutter source takes place and the weights are stored in RC circuits $R_2C_2$. After one PRI period, another pair of radar pulses (i.e. second and third) will be processed by the MTI system. Since weights were previously developed and stored for each range interval in the memories, the new I and Q weights developed for the second pair of pulses will be added to the previous I and Q weights. This integration process over a small number of samples (i.e., 20–30) will cause a weight to be built up that will effectively cancel each clutter source. The integration process will operate continuously to adjust to gradual changes in clutter.

The general operation of switches 48, 50 has been outlined but a more detailed description (as shown in FIG. 4) will assist in understanding the operation of the invention. As the operator notes clutter, he activates a control that generates two pulses starting just before the first clutter echos return. One pulse length is short with respect to the length of the clutter echo and other is slightly longer than the clutter echo. The short pulse is applied to FET 1 and the long pulse is applied to FET 2 to reduce their source-to-drain resistance from a very high value to a value less than $R_1$ in RC circuit $R_1C_1$. The two pulses close the adaptive-loop, feedback path and a weight is developed as previously described. After the weight is developed, the short pulse on FET 1 ends and the input to $R_1C_1$ becomes a very high resistance to prevent the voltage stored on C from discharging. During this time, the long pulse holds FET 2 at a low resistance so that the weight (i.e. voltage on $C_1$ amplified by FET 3) continues to cause clutter cancellation. AT the end of the long pulse FET 2 source-to-drain resistance becomes very high and opens the loop. A second portion of switches 48, 50 having FET 4, 5, 6 will operate similarly to place memory $R_2C_2$ in the circuit for a second source of clutter.

The advantage of using multiple memories in the adaptive-closed-loop canceller is that the RC time constant for each RC circuit can be lengthened thus causing a smaller weight build-up for each pulse while the integration process allows the weight to build-up from pulse to pulse. As a result of the lengthened time constant there will be less of a weight buildup with each pulse for a target. Since the target is moving rapidly from one range interval to another the target weight will not have a change to build up for one range interval.

Figure 5:
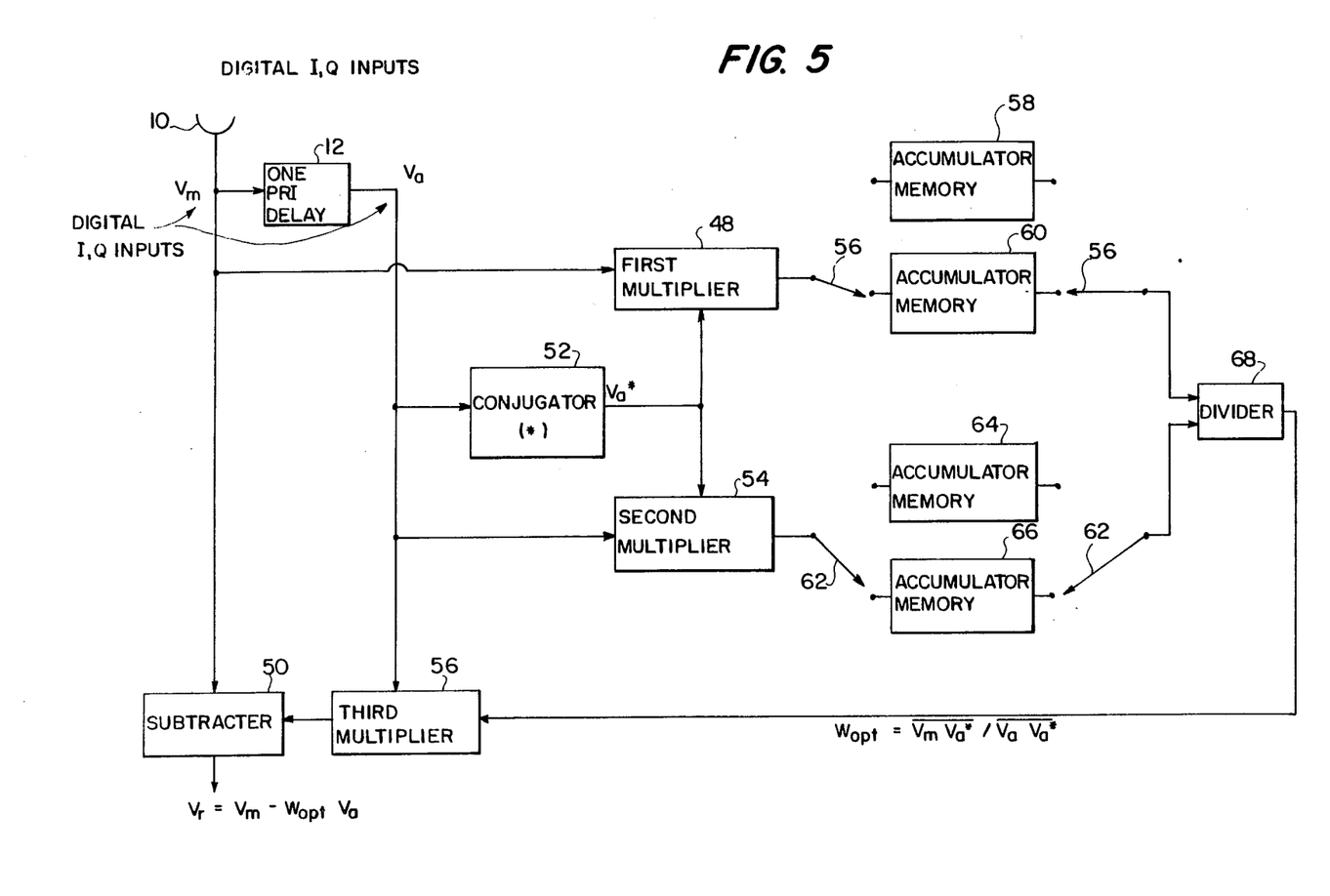
FIG. 5 is a block diagram of a digital, open-loop canceller having multiple memory circuits according to the present invention.

FIG. 5 shows a digital, open-loop canceller which is an alternative to the analog, closed-loop canceller of FIG. 3. It should be noted that both types of cancellers are adaptive-loop cancellers. The digital open loop canceller is described in Digital Open-Loop Sidelobe Canceller Techniques, Frank F. Kretschmer Bernard L. Lewis, NRL Report 8100, Apr. 6, 1977. The digital open loop canceller solves the same general equation for an adaptive loop as the closed loop canceller of FIG. 3.

$$V_r = V_m - WV_a$$

Where $V_m$ is a complex main input signal
$V_a$ is a complex auxiliary input signal
$V_r$ is an output residual signal
$W$ is the adaptive loop weight The digital open loop canceller differs in that it derives the optimum weight $W_{opt}$ differently. The $W_{opt}$ for the digital open loop canceller is $$W_{opt} = (\overline{V_m V_a^*}/\overline{V_a V_a^*})$$

Where $V_a^*$ is the conjugate of $V_a$

By substitution the equation for the digital open loop canceller is $$V_r = V_m - (\overline{V_m V_a^*}/\overline{V_a V_a^*}) V_a$$

Looking at the apparatus of the digital open loop canceller it receives two inputs, a digital complex signal $V_m$ which is the main input and a digital complex signal $V_a$ which is the auxiliary input. In the MTI system $V_m$ may be one of the received radar return pulses and $V_a$ may be a successively received pulse.

The digital I and Q components of $V_m$ are fed to a first multiplier 48 and to a subtracter 50. The digital I and Q components of $V_a$ are fed to a conjugator (*) 52, a second multiplier 54 and to a third multiplier 56. The conjugator receives the I and Q components of $V_a$ and multiplies the imaginary part Q by $-1$ to obtain $V_a^*$. The output of conjugator 52 is fed to first multiplier 48 for multiplication with $V_m$ to obtain the product $V_m V_a^*$. This product is applied through switch assembly 56 to multiple accumulator-memory circuits 58, 60. Each of the multiple accumulator-memory circuits is an accumulator which will continuously sum the samples for a particular range interval over time (i.e., from pulse to pulse for a given number of pulses). The sum developed will be built up over time and will continuously change on a pulse-to-pulse basis. The sum is always present in the accumulator and is therefore stored from pulse-to-pulse.

The output of conjugator 52 is also fed to second multiplier 54 for multiplication with $V_a$ to obtain the product $V_a V_a^*$. The product is applied through switching assembly 62 to multiple accumulator-memory circuits 64, 66 which are identical to accumulator-memory circuits 58, 60.

The output sums from the accumulator memories through switches 56, 62 are used as part of an averaging process. Normally, to average, the output sums from the accumulator-memories would be divided by the number of the samples summed. However, since the outputs are fed to a divider 68 the sample number which is the same for each accumulator-memory cancels itself out in the division. The combination of the accumulatory-memories and divider 68 results in the development and storage of the adaptive loop weight $W_{opt}$. This is the same function that the RC circuits perform in the adaptive closed loops of FIG. 3. The output of divider 68 produces the following relation, $$(\overline{V_m V_a^*}/\overline{V_a V_a^*})$$

This quantity is the desired value for the weight $W_{opt}$.

It can be shown that the quantities $V_m V_a^*$ and $V_a V_a^*$ must be averaged (i.e., $\overline{V_m V_a^*}$ and $\overline{V_m V_a^*}$) or all signals out of the canceller are cancelled including the desired components of $V_m$. This can be seen by examining mathematical correlation function for example, those shown in Reference Data for Radio Engineers", Howard Sams, ITT, 1972 p. 39-11.

The output of divider 68, weight $W_{opt}$ is fed to third multiplier 56, which also receives $V_a$, to obtain the following relation:

$$(\overline{V_m V_a^*}/\overline{V_a V_a^*}) V_a$$

The output of multiplier 56 is fed to subtractor 50, which also receives $V_m$, to obtain the following relation which is the desired canceller equation.

$$V_r = V_m - (\overline{V_m V_a^*}/\overline{V_a V_a^*}) V_a$$

The equation is not dependent on gain G or auxiliary power level. The optimum weight W from the input signals is determined in an open-loop manner. The effective gain of the open-loop digital canceller is infinite and stability considerations are completely eliminated. The optimum weighting by the digital open-loop canceller allows cancellation of undesired signals to the thermal noise level.

Switching assemblies 56, 62 operate according to the same principles as switching assemblies 48, 50 of the analog, closed-loop canceller FIG. 3. The operator must be able to observe one or more sources of clutter in different range intervals and be able to switch in a memory circuit for each source of clutter. Switches 56, 62 will be commutated so that each is switched to the proper memory for a range interval simultaneously. Such a digital switching circuit is within the skill of the art and may be designed in view of switching assemblies 48, 50.

Figure 6:
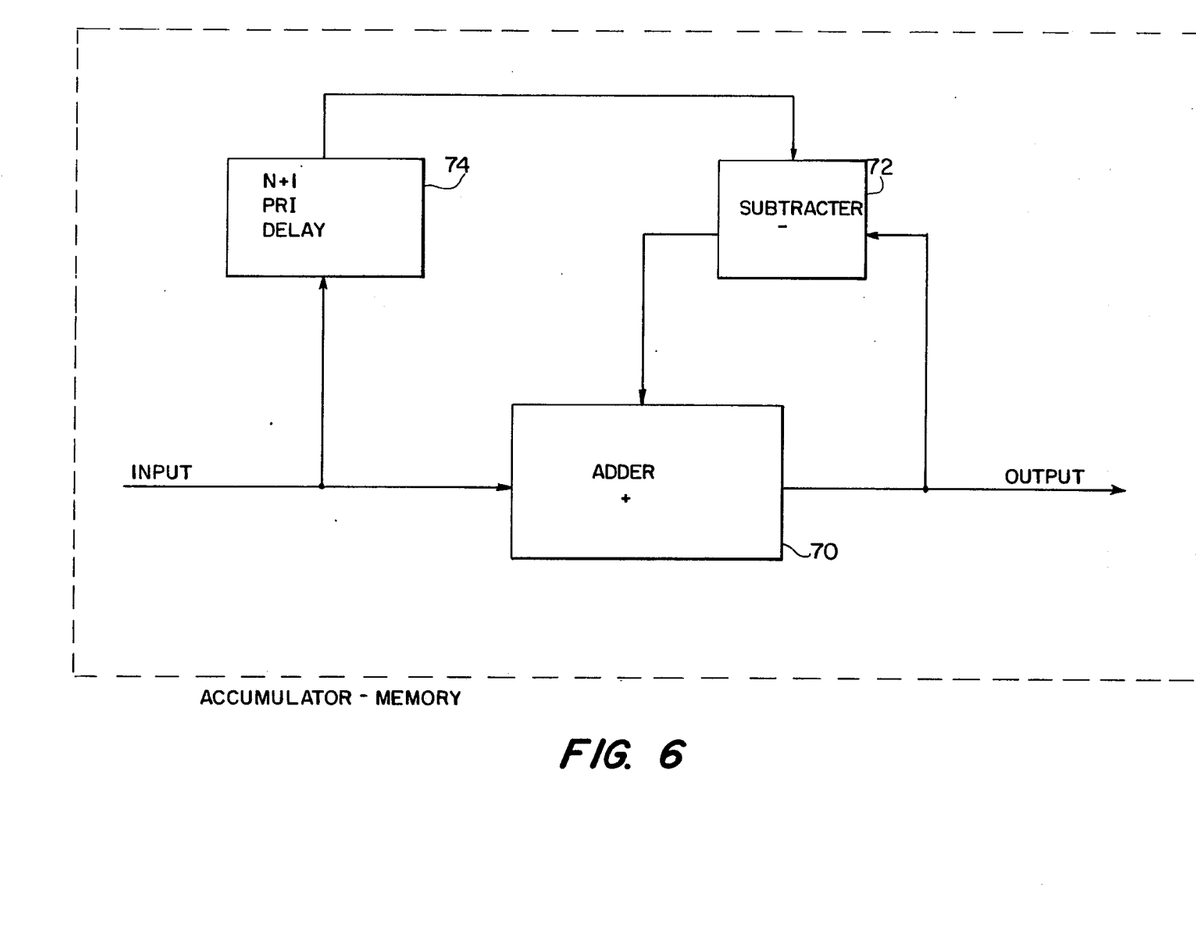
FIG. 6 is a block diagram of the memory circuits used in the canceller of FIG. 5.

FIG. 6 shows an embodiment of an accumulator used for memories 58, 60, at the input. The first pulse will pass through adder 70 and be fed back through subtracter 72 to the adder. Nothing is present in the subtracter for the first N pulses so the outputs from adder 70 pass straight through for N pulses. When the second pulse enters adder 70 it is added to the first pulse. Likewise the third pulse will be added in the second pulse and the sequence of addition will continue with the sum being accumulated. The accumulation will continue until N pulses are summed. When the N + 1 pulse comes in the first pulse which was fed to N + 1 PRI delay 74 will pass out of delay 74 and enter subtracter 72 where it will subtract out the sum from pulse 1. In other words as the N + 1 pulse is being summed in adder 70 the first pulse is being subtracted from the sum. This means that the sum will be a moving window sum always based on the most current N pulse samples.

The digital, open-loop canceller with multiple memories 58, 60, 64, 66 operates in the same manner as the analog, closed-loop canceller of FIG. 3 and repetition of the details of operation is unnecessary. As in the case of the adaptive, closed loop canceller the operator waits for clutter to show up on the display and activate controls to provide for switching different memory circuits into the adaptive loop.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. In a moving-target-indicator radar system having an antenna for receiving successive pulses, one or more serial PRI delays to delay said successive pulses and provide said successive pulses as concurrent signal sources, and an MTI canceller having one or more adaptive loop cancellers for receiving said concurrent signal sources and cancelling correlated components between said signal sources, the improvement to said MTI cancellers which comprises:

multiple memory means included in each said adaptive loop canceller, with each memory means receiving a weight developed in the adaptive loop canceller for a different range interval and storing the weight for the range interval on a pulse-to-pulse basis, and each adaptive loop canceller having a means for switching said memory means into said adaptive loop circuit during the range interval, the memory means for each of said adaptive loop cancellers for a particular range interval being switched simultaneously.

2. A moving-target-indicator radar system having an antenna for receiving successive pulses, one or more serial PRI delays to delay said successive pulses and provide said successive pulses as concurrent signal sources, and one or more adaptive-closed-loop cancellers for receiving said concurrent signal sources and cancelling correlated components between said signal sources, each said adaptive-closed-loop canceller comprising:

main-input terminal means for receiving one of said concurrent signal sources;

auxiliary-input terminal means for receiving another of said concurrent signal sources;

quadrature hybrid means receiving said auxiliary input for dividing the auxiliary input into its I and Q components;

a first closed-loop canceller made up of first subtracter and an I weighting circuit, the first subtracter receiving said main input and providing an output residue, and I weighting circuit including a first I multiplier means for receiving and multiplying said first subtracter output and said I component of said auxiliary input, a first multiple memory means for developing and storing an I weight W independently for each of several clutter sources, an amplifier for amplifying said I weight W, first switching means for coupling said first multiple memory means between said first I multiplier and said amplifier, a second I multiplier means for receiving and multiplying the output of said amplifier and said I component of said auxiliary input to produce a weighted I component of said auxiliary signal which is coupled to said first subtracter; and a second, closed-loop canceller made up of a second subtracter and a Q weighting circuit, the second subtracter receiving the output of the first subtracter and providing an output residue, said Q weighting circuit including a first Q multiplier means for receiving and multiplying said second subtracter output and said Q component of said auxiliary input, a second multiple memory means for developing and storing independently for each of several clutter sources a Q weight W, an amplifier for amplifying said Q weight W, second switching means for coupling said second multiple memory means between said first Q multiplier and said amplifier, said first and second switching means commutatively switching first and second multiple memory means for the same clutter sources simultaneously, a second Q multiplier means for receiving and multiplying the output of said amplifier and the Q component of said auxiliary terminal to produce a weighted Q component of said auxiliary signal which is coupled to said second subtracter.

3. The moving target indicator radar system of claim 1 in which each of said first and second multiple memory means are RC circuits.

4. A moving-target-indicator radar system having an antenna for receiving successive pulses, one or more serial PRI delays to delay said successive pulse and provide said successive pulses as digital complex concurrent signal sources, one or more adaptive-open-loop cancellers for receiving said concurrent signal sources and cancelling correlated components between said signal sources, each said adaptive open loop canceller comprising:

main input terminal means for receiving one of said concurrent signal sources and producing a main input;

auxiliary input terminal means for receiving another of said concurrent signal sources and producing an auxiliary input;

conjugator means for receiving and conjugating said auxiliary input;

first multiplier means for receiving and multiplying said main input and the output of said conjugator;

second multiplier means for receiving and multiplying said auxiliary input and the output of said conjugator;

first multiple accumulator memory means with each accumulator memory means for receiving and summing pulses from a different source of clutter independently;

second multiple accumulator-memory means with each accumulator-memory means for receiving and summing pulses from a different source of clutter independently;

divider means for receiving and dividing the outputs of said first and second multiple accumulator-memories to produce an output which is a weight;

first switching means for coupling said first accumulator-memory means between said first multiplier and said divider, said first switching means for coupling a different one of said accmulator-memories for each clutter source;

second switching means for coupling said second accmulator-memory means between said second multiplier and said divider, said second switching means acting simultaneously with said first switching means to couple a different one of said accumulator-memory means for each clutter source;

third multiplier means for receiving and multiplying said auxiliary input and the output of said divider means; and     subtracter means for receiving and subtracting said main input and said third multiplier output to produce an output signal in which said correlated signal components have been cancelled, with cancellation occurring for each clutter source.

5. The MTI system of claim 4 in which each said accumulator-memory comprises:

an adder for receiving pulses for a source of clutter;

an N + 1 PRI delay for receiving and delaying said pulses;

a subtracter for receiving and subtracting the outputs of said adder and said N + 1 PRI delay, the output of said subtracter coupled to said adder.

* * * * *